(12) United States Patent
Miller

(10) Patent No.: US 9,713,326 B2
(45) Date of Patent: Jul. 25, 2017

(54) INSECT BAIT APPLICATION DEVICE

(71) Applicant: Glenn William Miller, Orlando, FL (US)

(72) Inventor: Glenn William Miller, Orlando, FL (US)

( * ) Notice: Subject to any disclaimer, the term of this patent is extended or adjusted under 35 U.S.C. 154(b) by 49 days.

(21) Appl. No.: 14/712,986

(22) Filed: Jun. 22, 2015

(65) Prior Publication Data

US 2016/0100568 A1   Apr. 14, 2016

Related U.S. Application Data

(60) Provisional application No. 62/061,925, filed on Oct. 9, 2014.

(51) Int. Cl.
*A01M 1/20* (2006.01)
*A01M 1/10* (2006.01)

(52) U.S. Cl.
CPC .......... *A01M 1/2011* (2013.01); *A01M 1/103* (2013.01); *A01M 1/2005* (2013.01)

(58) Field of Classification Search
CPC ... A01M 1/2005; A01M 1/2011; A01M 1/103
USPC .................................. 43/131, 121; D22/122
See application file for complete search history.

(56) References Cited

U.S. PATENT DOCUMENTS

| 140,954 | A | * | 7/1873 | Rubarth | A01M 1/103 |
| | | | | | 43/121 |
| 464,535 | A | * | 12/1891 | Walker | 43/121 |
| 473,965 | A | * | 5/1892 | Royse | 43/121 |
| 567,076 | A | * | 9/1896 | Brown | 43/121 |
| 602,410 | A | * | 4/1898 | Selvidge | 43/121 |
| D32,432 | S | * | 4/1900 | Lewis | 43/121 |
| 944,568 | A | * | 12/1909 | Mercer | A01M 1/10 |
| | | | | | 43/121 |
| 970,528 | A | * | 9/1910 | Miller | 43/121 |
| 986,015 | A | * | 3/1911 | Lambert | 43/121 |
| 1,424,596 | A | * | 8/1922 | Scrivner | A01M 1/10 |
| | | | | | 43/121 |
| 1,519,456 | A | * | 12/1924 | Jones | A01M 1/20 |
| | | | | | 43/131 |
| 1,540,621 | A | * | 6/1925 | Hanson | A01M 1/2005 |
| | | | | | 43/131 |
| 1,573,278 | A | * | 2/1926 | Schlesinger | A01M 1/2011 |
| | | | | | 43/131 |
| 1,666,509 | A | * | 4/1928 | Schlossareck | A01M 1/04 |
| | | | | | 362/101 |
| 1,667,048 | A | * | 4/1928 | Rawlings | A01M 23/00 |
| | | | | | 43/121 |
| 1,700,517 | A | * | 1/1929 | Ross | A01M 1/2005 |
| | | | | | 43/131 |

(Continued)

FOREIGN PATENT DOCUMENTS

DE   EP 1078572 A1 *  2/2001  .......... A01M 25/008
EP      658306 A1 *  6/1995

(Continued)

OTHER PUBLICATIONS

Translation of JP2003-070403.*

*Primary Examiner* — Darren W Ark

(57) ABSTRACT

A method and device for distributing and containing ant bait that provides a dry environment and prolongs its effectiveness through a temporarily reusable device.

4 Claims, 2 Drawing Sheets

(56) References Cited

U.S. PATENT DOCUMENTS

| | | | | |
|---|---|---|---|---|
| 1,729,389 A * | 9/1929 | Hughett | A01M 1/2005 | 43/131 |
| 1,797,743 A * | 3/1931 | Wesson | A01M 1/02 | 43/121 |
| 1,815,595 A * | 7/1931 | Simpson | A01M 1/2005 | 43/131 |
| 1,887,771 A * | 11/1932 | Marsh | A01M 1/2005 | 43/121 |
| 1,902,723 A * | 3/1933 | Roberts | A01M 1/2044 | 43/131 |
| 1,916,982 A * | 7/1933 | Jones | A01M 1/2055 | 43/131 |
| 1,922,702 A * | 8/1933 | Kristman | A01M 1/2005 | 43/131 |
| 1,960,464 A * | 5/1934 | Thalheimer | A01M 1/02 | 43/131 |
| 2,046,430 A * | 7/1936 | Rutherford | A01M 1/02 | 43/107 |
| 2,063,768 A * | 12/1936 | Staffel | A01M 1/2005 | 43/131 |
| 2,157,953 A * | 5/1939 | De Long | A01M 1/2005 | 43/131 |
| 2,167,978 A * | 8/1939 | Jennerich | A01M 1/2005 | 43/121 |
| 2,606,391 A * | 8/1952 | McGrew | A01M 1/02 | 43/131 |
| 2,710,485 A * | 6/1955 | Starr | A01M 25/004 | 43/131 |
| 3,324,590 A * | 6/1967 | Richardson | A01M 1/2005 | 43/131 |
| 3,704,539 A * | 12/1972 | Alvarez | A01M 1/2011 | 43/131 |
| 4,035,946 A * | 7/1977 | Rapp | A01M 25/004 | 43/131 |
| 4,173,093 A * | 11/1979 | Nakai | A01M 1/02 | 43/121 |
| 4,251,946 A * | 2/1981 | Lindley | A01M 25/004 | 43/131 |
| 4,277,907 A * | 7/1981 | Ernest | A01M 25/004 | 43/131 |
| 4,563,836 A * | 1/1986 | Woodruff | A01M 1/2011 | 43/131 |
| 4,698,934 A * | 10/1987 | Gonzalez | A01M 1/10 | 43/121 |
| 4,747,230 A * | 5/1988 | Zalesky | A01M 25/008 | 43/131 |
| 4,761,912 A * | 8/1988 | Dyer | A01M 25/008 | 43/121 |
| 4,782,621 A * | 11/1988 | Wissman | A01M 1/2005 | 43/131 |
| 5,033,229 A * | 7/1991 | Demarest | A01M 1/2011 | 43/124 |
| 5,048,225 A * | 9/1991 | Brandli | A01M 1/2011 | 43/131 |
| 5,090,153 A * | 2/1992 | Mullen | A01M 1/026 | 43/114 |
| 5,357,709 A * | 10/1994 | Lin | A01M 1/2005 | 43/131 |
| 5,548,922 A * | 8/1996 | Wefler | A01M 1/2011 | 43/131 |
| 5,657,575 A * | 8/1997 | Miller | A01M 25/008 | 43/131 |
| D383,827 S * | 9/1997 | Barbone | D22/122 | |
| 5,737,870 A * | 4/1998 | Thind | A01M 1/026 | 43/121 |
| 5,802,761 A * | 9/1998 | Demarest | A01M 1/2011 | 43/131 |
| 5,870,853 A * | 2/1999 | Williams | A01M 1/2005 | 43/131 |
| 5,943,816 A * | 8/1999 | Hyatt | A01M 1/2005 | 239/34 |
| 5,953,854 A * | 9/1999 | Hyatt | A01M 1/026 | 43/131 |
| 5,960,585 A * | 10/1999 | Demarest | A01M 1/2011 | 43/131 |
| 5,983,558 A * | 11/1999 | Las | A01M 1/2005 | 43/131 |
| 6,216,384 B1 * | 4/2001 | Dickson | A01M 1/2005 | 43/131 |
| 6,272,791 B1 * | 8/2001 | Pleasants | A01M 1/2011 | 43/131 |
| 6,401,384 B1 * | 6/2002 | Contadini | A01M 1/026 | 43/131 |
| 6,467,216 B2 * | 10/2002 | McManus | A01M 1/2005 | 43/131 |
| 6,871,444 B1 * | 3/2005 | Bernard | A01M 1/2005 | 43/131 |
| 7,043,873 B2 * | 5/2006 | Westphal | A01M 1/2005 | 43/124 |
| 7,310,908 B2 * | 12/2007 | Bernard | A01M 1/2005 | 43/131 |
| 7,325,358 B1 * | 2/2008 | Chalupsky | A01M 29/12 | 239/34 |
| 7,806,286 B2 * | 10/2010 | Berge | A01M 1/2005 | 43/131 |
| 8,341,875 B2 * | 1/2013 | Van Dyke | A01K 69/06 | 43/121 |
| 8,448,376 B2 * | 5/2013 | Kagawa | A01M 1/106 | 43/131 |
| 9,451,761 B2 * | 9/2016 | Messina | A01M 1/2011 | |
| 2003/0145511 A1 * | 8/2003 | Finn | A01M 1/2005 | 43/131 |
| 2005/0097811 A1 * | 5/2005 | Scribner | A01M 1/2005 | 43/131 |
| 2005/0252074 A1 * | 11/2005 | Duston | A01M 1/2005 | 43/131 |
| 2008/0104882 A1 * | 5/2008 | Bernard | A01M 1/2011 | 43/131 |
| 2010/0031556 A1 * | 2/2010 | Kupfer | A01M 1/2011 | 43/131 |
| 2011/0088310 A1 * | 4/2011 | Parker | A01M 1/2011 | 43/131 |
| 2012/0066960 A1 * | 3/2012 | Pryor | A01M 1/2011 | 43/131 |
| 2017/0055513 A1 * | 3/2017 | Darnell | A01M 1/12 | |

FOREIGN PATENT DOCUMENTS

| | | | | |
|---|---|---|---|---|
| EP | 793913 A1 | * | 9/1997 | |
| JP | 11346626 A | * | 12/1999 | |
| JP | 2002209499 A | * | 7/2002 | |
| JP | 2002320437 A | * | 11/2002 | |
| JP | 2003070403 A | * | 3/2003 | |
| JP | 2011010629 A | * | 1/2011 | |
| JP | 2013138669 A | * | 7/2013 | |
| JP | 2014077016 A | * | 5/2014 | |
| SE | WO 0072671 A1 | * | 12/2000 | A01K 67/033 |

* cited by examiner

INSECT BAIT APPLICATION DEVICE

TECHNICAL FIELD

The Ring of Fire is a formed plastic housing device with a "donut" style shape that contains a prefilled commercial produced ant bait. The device can be used on multiple ant locations until bait is depleted.

BACKGROUND

It is well known that commercial fire ant baits are rendered useless when water comes in contact with the bait. This device is designed to shed water from rain and irrigation systems keeping the bait inside dry.

This device allows for a "non-human contact" solution for fire ant bait distribution.

SUMMARY

This device has a "peel off" barrier on the bottom that allows the ant bait to stay contained inside. Once removed, a ⅛" gap between the upper and lower "shell" is exposed allowing ants to enter the device and carry the bait back to the mound.

The device contains enough bait for multiple applications.

DETAILED DESCRIPTION

Figure 1:
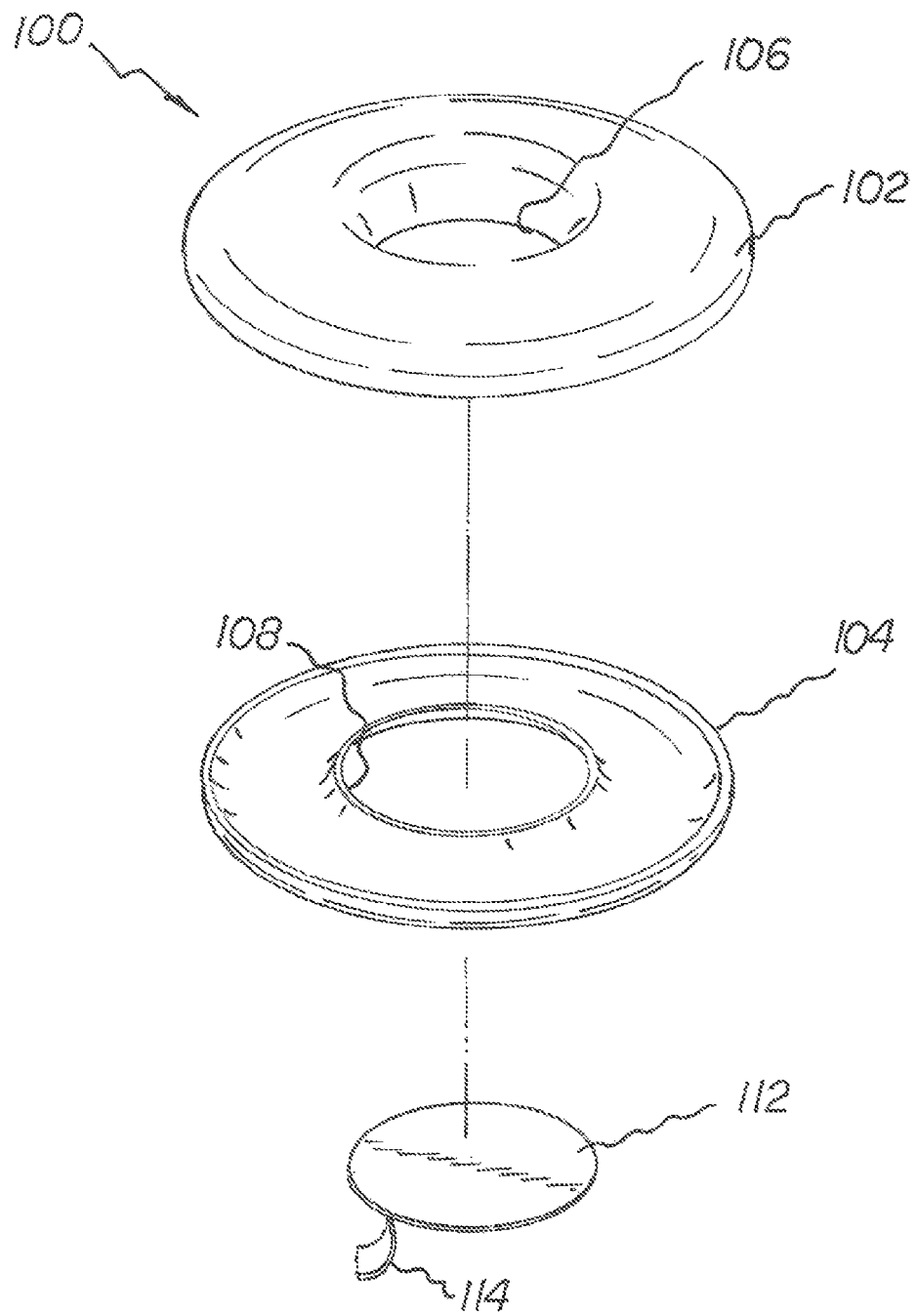
FIG. 1 is an exploded perspective view of the insect bait application device showing upper and lower portions.
Figure 2:
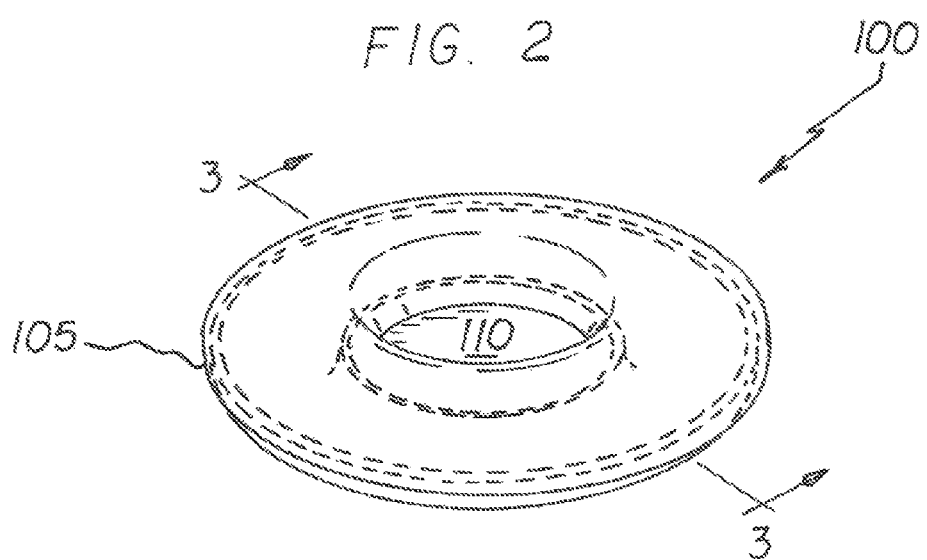
FIG. 2 is a perspective view of the assembled insect bait application device.
Figure 3:
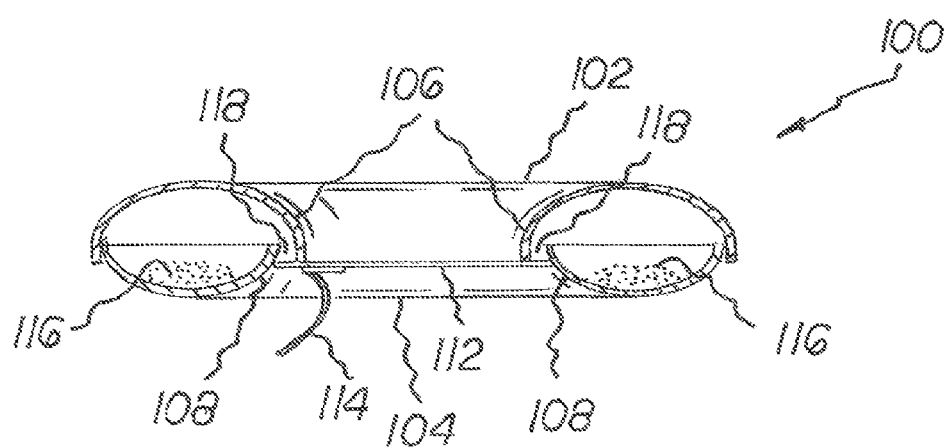
FIG. 3 is a cross sectional view taken in the direction of line 3-3 of FIG. 2.

FIG. 1 is an exploded view of the device 100 that shows a molded upper portion 102 and lower 104 portion that form a housing 105 of an insect bait application device 100. The upper portion 102 is a "concave" upper shell with a downward center protrusion 106. The lower portion 104 is a "concave" lower shell that may be slightly smaller in the outer diameter and have an upward center protrusion 108. The upward center protrusion 108, which may be about ¼ inch larger, slides over the downward center protrusion 106. When the upper 102 and lower portions 104 are assembled together, they create a hollow "donut" shape housing 105 (i.e., toroidal) that contains the insect bait 116 inside. When assembled, the housing 105 defines an inner sidewall comprised of the upward and downward center protrusions 106 and 108, that define the center aperture 110. There may be a ⅛ inch offset gap 118 extending in concentric relation along the inner sidewall between the two center protrusions 106 and 108 as shown in FIGS. 2 and 3. The downward center protrusion 106 extends over the upper center protrusion 108 that allows insects (e.g., ants) to enter and exit the device 100, while retaining the ability to shed water off the device 100, allowing the bait 116 to remain dry.

The device 100 may be made in various sizes, shapes and colors, but most commonly uses a 5 inch over all diameter, 1 ½ inch height profile and a 2 inch center aperture 110.

The device 100 may be constructed from 015 to 040 vacuum form plastics.

FIGS. 2 and 3 show the upper and lower portions 102 and 104 assembled together to form the hollow "donut" shaped housing 105 described above and having the inner sidewall defining the center aperture 110. The housing 105 is configured to store insect bait therein. As shown in FIG. 3, when assembled, the inner sidewall has an upper portion (i.e., the downward center protrusion 106) that extends over a lower portion (i.e., the upward center protrusion 108) of the inner sidewall to define the offset gap 118.

The device 100 may also include a removable cover 112 having a peel off tab 114 that fits inside of the upward center protrusion 108 and adheres to the bottom of the downward center protrusion 106. This is to contain the bait 116 during transport and until it is ready to be used.

The invention claimed is:

1. An insect bait application device, the device comprising:
    a housing having an upper portion and a lower portion, and a center aperture extending completely through the upper and lower portions along an axis of the device so as to communicate with an exterior of the device, and the housing configured to store insect bait therein, the upper portion having a downwardly facing concave surface defined between downwardly facing inner and outer edges of the upper portion, the inner and outer edges of the upper portion defining innermost and outermost extents of the upper portion, the lower portion having an upwardly facing concave surface defined between upwardly facing inner and outer edges of the lower portion, the inner and outer edges of the lower portion defining innermost and outermost extents of the lower portion, the inner and outer edges of the upper portion extending below the inner and outer edges of the lower portion, the upwardly facing concave surface and the inner and outer edges of the lower portion being located between the inner and outer edges of the upper portion, and the inner edge of the upper portion located between the axis of the device and the inner edge of the lower portion in a radial direction from the axis of the device toward the outer edge of the upper portion; and
    an offset gap formed between the inner edge of the upper portion and the inner edge of the lower portion, the offset gap being in concentric relation with respect to the center aperture and providing an entrance into a hollow interior of the housing.

2. The insect bait application device of claim 1, wherein the housing having a toroidal shape.

3. The insect bait application device of claim 1, wherein the offset gap is about ⅛ inch in width.

4. The insect bait application device of claim 1, further comprising a removable cover configured to fit within the center aperture and cover the offset gap to prevent insect bait from falling out during transport.

* * * * *